US006999612B1

(12) United States Patent
Oliensis

(10) Patent No.: US 6,999,612 B1
(45) Date of Patent: Feb. 14, 2006

(54) METHOD FOR RECOVERING 3D SCENE STRUCTURE AND CAMERA MOTION DIRECTLY FROM IMAGE INTENSITIES

(75) Inventor: John Oliensis, New York, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 567 days.

(21) Appl. No.: 09/652,820

(22) Filed: Aug. 31, 2000

(51) Int. Cl.
*G06K 9/00* (2006.01)

(52) U.S. Cl. .................................................. 382/154
(58) Field of Classification Search ............. 382/154, 382/284, 294, 103, 289; 348/36, 42, 51
See application file for complete search history.

(56) References Cited

U.S. PATENT DOCUMENTS 6,614,429 B1 * 9/2003 Zhang et al. ............... 345/420

OTHER PUBLICATIONS

Aguiar et al., "Factorization as a Rank 1 Problem," IEEE, pp. 178-184, 1999.*
Wang et al., "A SVD Decomposition of Essential Matrix with Eight Solutions for the Relative Positions of Two Perspective Cameras," IEEE, pp. 362-365, 2000.*
Diamantaras et al., "Camera Motion Parameter Recovery Under Perspective Projection," IEEE, pp. 807-810, 1996.*
Kung et al., "An SVD Approach to Multi-Camera-Multi-Target 3D Motion-Shape Analysis," IEEE, pp. 573-577, 1994.*
Bergen et al., "Hierarchical Model-Based Motion Estimation," ECCV, pp. 237-252, 1992.

Barron et al., "Systems and Experiment, Performance of Optical Flow Techniques," International Journal of Computer Vision, pp. 43-47, 1994.
Brodsky et al., "Self-Calibration from Image Derivatives," ICCV, pp. 83-89, 1998.
Burt et al., "The Laplacian Pyramid as a Compact Image Code," IEEE Transactions on Communications, vol. Com. 2, No. 4, pp. 532-540, 1983.
Fermuller, "Passive Navigation as a Pattern Recognition Problem," International Journal of Computer Vision, pp. 147-158, 1995.
Fermuller et al., "Direct Perception of Three-Dimensional Motion from Patterns of Visual Motion," Science, vol. 270, pp. 1973-1976, 1995.
Hanna, "Direct multi-resolution estimation of ego-motion and structure from motion," IEEE Motion Workshop, pp. 156-162, 1991.
Horn et al., "Determining Optical Flow," Artificial Intelligence, pp. 185-203, 1981.

(Continued)

*Primary Examiner*—Vikkram Bali

(57) ABSTRACT

The present invention is directed to a method for recovering 3D scene structure and camera motion from image data obtained from a multi-image sequence, wherein a reference image of the sequence is taken by a camera at a reference perspective and one or more successive images of the sequence are taken at one or more successive different perspectives by translating and/or rotating the camera, the method comprising the steps of determining image data shifts for each successive image with respect to the reference image; constructing a shift data matrix that incorporates the image data shifts for each image, wherein a first vector corresponds to the 3D structure and a second vector corresponds to the size of the camera motion; dividing the successive images into windows; and determining the direction of camera motion and 3D structure from the first and second vector between the windows.

10 Claims, 2 Drawing Sheets

OTHER PUBLICATIONS

Irani, "Multi-Frame Optical Flow Estimation Using Subspace Constraints," IEEE, pp. 626-633, 1999.

Irani et al., "Direct Recovery of Planar-Parallax from Multiple Frames," Vision Algorithms—Pre-Proceedings, pp. 1-8, 1999.

Irani et al., "From Reference Frames to Reference Planes: Multi-view Parallax Geometry and Applications," ECCV, pp. 829-845, 1998.

Irani et al., "Recovery of Ego-Motion Using Region Alignment," IEEE, pp. 268-272, 1997.

Jepson et al., "Linear subspace methods for recovering translational direction," in Spatial Vision in Humans and Robots, pp. 39-62, 1993.

Kumar et al., "Direct recovery of shape from multiple views: a parallax based approach," IEEE, pp. 685-688, 1994.

Lucas et al., "An Iterative Image Registration Technique with an Application to Stereo Vision," Proceedings of the Seventh International Joint Conference on Artificial Intelligence, vol. II, pp. 674-679, 1981.

Mandelbaum et al., "Correlation-Based Estimation of Egomotion and Structure from Motion and Stereo," IEEE, pp. 544-550, 1999.

Oliensis et al., "Structure from Motion using Points, Lines, and Intensities," IEEE, pp. 599-605, 2000.

Oliensis et al., "Fast Algorithms for Projective Multi-Frame Structure from Motion," IEEE, pp. 536-543, 1999.

Oliensis, "A Multi-Frame Structure-from-Motion Algorithm under Perspective Projection," international Journal of Computer Vision, pp. 163-192, 1999.

Oliensis, "Multiframe Structure from Motion in Perspective," IEEE, pp. 77-84, 1995.

Oliensis, "Structure from Linear or Planar Motions," IEEE, pp. 335-342, 1996.

Oliensis, "A Linear Solution for Multiframe Structure from Motion," IUW, pp. 1225-1231, 1994.

Oliensis, "Rigorous Bounds for Two-Frame Structure from Motion," ECCV, pp. 184-195, 1995.

Sawhney, "3D Geometry From Planar Parallax," IEEE, pp. 929-934, 1994.

Shashua et al., "Relative Affine Structure: Theory and Application to 3D Reconstruction From Perspective Views," IEEE, pp. 483-489, 1994.

Stein et al., "Model-based Brightness Constraints: on Direct Estimation of Structure and Motion," IEEE, pp. 400-406, 1997.

Sturm et al., "A Factorization Based Algorithm for Multi-Image Projective Structure and Motion," ECCV, pp. 709-722, 1996.

Zelnik-Manor et al., "Multi-Frame Alignment of Planes," IEEE, pp. 151-156, 1999.

Torr, "Geometric Motion Segmentation and Model Selection," Phil. Trans. R. Soc. London A, pp. 1-17, 1996.

Torr, "Model Selection for Two View Geometry: A Review," Microsoft Research paper.

Zelnik-Manor et al., "Multi-View Subspace Constraints on Homographies," IEEE, 1999.

Kumar et al., "Shape recovery from multiple views: a parallax based approach," David Sarnoff Research Center, pp. 947-955.

Hartley, "A linear method for reconstruction from lines and points," GE-Corporate Research and Development.

Hanna et al., "Combining Stereo and Motion Analysis for Direct Estimation of Scene Structure,", IEEE, pp. 357-365, 1993.

Cohen, "Dense Recovery of Planar-Parallax from Multiple Frames," Thessi for the M.Sc. Degree of Meir Cohen, Weizmann Institute of Science, 1999.

Lucas et al., "Optical Navigation by the Method of Differences," Computer Science Deparment of Carnegie-Mellon University.

Fermuller et al., "Global rigidity constraints in image displacement fields," IEEE, pp. 245-250, 1995.

* cited by examiner

METHOD FOR RECOVERING 3D SCENE STRUCTURE AND CAMERA MOTION DIRECTLY FROM IMAGE INTENSITIES

RELATED APPLICATION

The present application is related to U.S. application Ser. No. 09/653,023, titled A Method for Recovering 3D Structure and Camera Motion from Points, Lines and/or Directly from the Image Intensities, filed on Sep. 1, 2000 by the same inventor as the present application, which related application is incorporated herein by reference.

BACKGROUND OF THE INVENTION

1. Field of the Invention

The present invention relates generally to a method for recovering the camera motion and 3D scene structure and, more particularly, to a linear algorithm for recovering the structure and motion directly from the image intensities where the camera moves along a line.

2. Prior Art

The science of rendering a 3D model from information derived from a 2D image predates computer graphics, having its roots in the fields of photogrammetry and computer vision.

Photogrammetry is based on the basic idea that when a picture is taken, the 3D world is projected in perspective onto a flat 2D image plane. As a result, a feature in the 2D image seen at a particular point actually lies along a particular ray beginning at the camera and extending out to infinity. By viewing the same feature in two different photographs the actual location can be resolved by constraining the feature to lie on the intersection of two rays. This process is known as triangulation. Using this process, any point seen in at least two images can be located in 3D. It is also possible to solve for unknown camera positions as well with a sufficient number of points. The techniques of photgrammetry and triangulation were used in such applications as creating topographic maps from aerial images. However the photogrammetry process is time intensive and inefficient.

Computer vision techniques include recovering 3D scene structure from stereo images, where correspondence between the two images is established automatically from two images via an iterative algorithm, which searches for matches between points in order to reconstruct a 3D scene. It is also possible to solve for the camera position and motion using 3D scene structure from stereo images.

Current computer techniques are focused on motion-based reconstruction and are a natural application of computer technology to the problem of inferring 3D structure (geometry) from 2D images. This is known as Structure-from-Motion. Structure from motion (SFM), the problem of reconstructing an unknown 3D scene from multiple 2D images of it, is one of the most studied problems in computer vision.

SFM algorithms are currently known that reconstruct the scene from previously computed feature correspondences, usually tracked points. Other algorithms are direct methods that reconstruct from the images' intensities without a separate stage of correspondence computation. The method of the present invention presents a direct method that is non-iterative, linear, and capable of reconstructing from arbitrarily many images. Previous direct methods were limited to a small number of images, required strong assumptions about the scene, usually planarity or employed iterative optimization and required a starting estimate.

These approaches have complementary advantages and disadvantages. Usually some fraction of the image data is of such low quality that it cannot be used to determine correspondence. Feature-based method address this problem by pre-selecting a few distinctive point or line features that are relatively easy to track, while direct methods attempt to compensate for the low quality of some of the data by exploiting the redundancy of the total data. Feature-based methods have the advantage that their input data is relatively reliable, but they neglect most of the available image information and only give sparse reconstructions of the 3D scene. Direct methods have the potential to give dense and accurate 3D reconstructions, due to their input data's redundancy, but they can be unduly affected by large errors in a fraction of the data.

A method based on tracked lines is described in "A Linear Algorithm for Point and Line Based Structure from Motion", M. Spetsakis, CVGIP 56:2 230–241, 1992, where the original linear algorithm for 13 lines in 3 images was presented. An optimization approach is disclosed in C. J. Taylor, D. Kriegmann, "Structure and Motion from Line Segments in Multiple Images,"PAMI 17:11 1021–1032, 1995. Additionally, in "A unified factorization algorithm for points, line segments and planes with uncertainty models" K. Morris and I. Kanade, ICCV 696–702, 1998, describes work on lines in an affine framework. A projective method for lines and points is described in "Factorization methods for projective structure and motion", B. Triggs, CVPR 845–851, 1996, which involves computing the projective depths from a small number of frames. "In Defense of the Eight-Point Algorithm": PAMI 19, 580–593, 1995, Hartley presented a full perspective approach that reconstructs from points and lines tracked over three images.

The approach described in M. Irani, "Multi-Frame Optical Flow Estimation using Subspace Constraints," ICCV 626–633, 1999 reconstructs directly from the image intensities. The essential step of Irani for recovering correspondence is a multi-frame generalization of the optical-flow approach described in B. Lucas and T. Kanade, "An Iterative Image Registration Technique with an Application to Stereo Vision", IJCAI 674–679, 1981, which relies on a smoothness constraint and not on the rigidity constraint. Irani uses the factorization of D simply to fill out the entries of D that could not be computed initially. Irani writes the brightness constancy equation (7) in matrix form as $\Delta = -DI$, where D tabulates the shifts $d_i$ and I contains the intensity gradients $\nabla I(p_n)$. Irani notes that D has rank 6 (for a camera with known calibration), which implies that $\Delta$ must have rank 6. To reduce the effects of noise, Irani projects the observed $\Delta$ onto one of rank 6. Irani then applies a multi-image form of the Lucas-Kanade approach to recovering optical flow which yields a matrix equation $DI_2 = -\Delta_2$, where the entries of $I_2$ are squared intensity gradients $I_a I_b$ summed over the "smoothing" windows, and the entries of $\Delta_2$ have the form $I_a \Delta I$. Due to the added Lucas-Kanade smoothing constraint, the shifts D or $d^i_n$ can be computed as $D = -\Delta_2 [I_2]^+$ denotes the pseudo-inverse, except in smoothing windows where the image intensity is constant in at least one direction. Using the rank constraint on D, Irani determines additional entries of D for the windows where the intensity is constant in one direction.

Any algorithm for small, linear motion confronts the aperture problem: the fact that the data within small image windows do not suffice to determine the correspondence unless one makes prior assumptions about the scene or motion. The aperture problem makes correspondence recovery a difficult and sometimes impossible global task. To avoid this, researchers typically impose a smoothness assumption. Lucas-Kanade uses a smoothing technique to address the aperture problem.

SUMMARY OF THE INVENTION

The present invention is directed to a method for recovering 3D scene structure and camera motion from image data obtained from a multi-image sequence, wherein a reference image of the sequence is taken by a camera at a reference perspective and one or more successive images of the sequence are taken at one or more successive different perspectives by translating and/or rotating the camera, the method comprising the steps of:

(a) determining image data shifts for each successive image with respect to the reference image; the shifts being derived from the camera translation and/or rotation from the reference perspective to the successive different perspectives;

(b) constructing a shift data matrix that incorporates the image data shifts for each image;

(c) calculating a rank-1 factorizations from the shift data matrix using SVD, with one of the rank-1 factors being a vector corresponding to the 3D structure and the other rank-1 factor being a vector corresponding to the size of the camera motions;

(d) dividing the successive images into smoothing windows;

(e) recovering the direction of camera motion from the first vector corresponding to the 3D structure by solving a linear equation; and (f) recovering the 3D structure by solving a linear equation using the recovered camera motion.

In accordance with the method of the present invention, step (e) includes step (e) includes:

computing a first projection matrix;

recovering camera rotation vectors from the shift data matrix, and the first projection matrix;

computing a second projection matrix; and recovering the direction of camera translation using the shift data matrix, the reference image, the second projection matrix and the recovered camera rotation vectors.

In addition, step (f) includes recovering the 3D structure from the shift data matrix, the reference image, the recovered camera rotation vectors and the recovered direction of translation vectors.

The method of the present invention further includes preliminary steps of recovering the rotations of the camera between each successive image; and warping all images in the sequence toward the reference image, while neglecting the translations.

The present invention provides an algorithm for linear camera motion, where the camera moves roughly along a line, possibly with varying velocity and arbitrary rotations. The approach of the present invention applies for calibrated or uncalibrated cameras (the projective case). For specificity, we focus on the calibrated case, assuming (wlog) that the focal length is 1. The method is based on the brightness constancy equation (BCE) and thus requires the motion and image displacements to be small enough so that the intensity changes between images can be modeled by derivatives at some resolution scale.

BRIEF DESCRIPTION OF THE DRAWINGS

These and other features, aspects, and advantages of the methods of the present invention will become better understood with regard to the following description, appended claims, and accompanying drawings where:

DETAILED DESCRIPTION OF THE PREFERRED EMBODIMENT

Definitions

Figure 1:
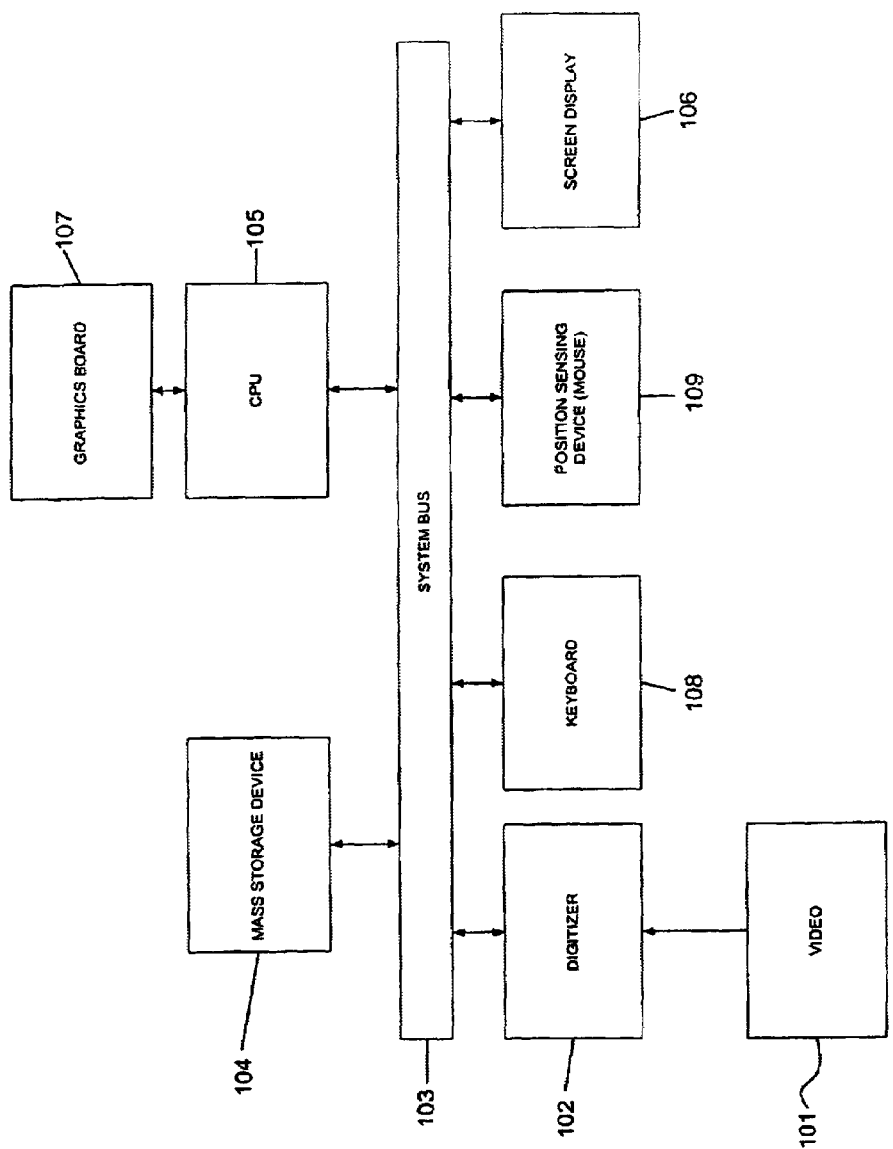
FIG. 1 schematically illustrates a hardware implementation of the present invention.

The method of the present invention assumes that the 3D structure is to be recovered from an image sequence consists of $N_I$ images of fixed size, each with $N_p$ pixels. Let $p_n \equiv (x_n, y_n)^T$ give the image coordinates of the n-th pixel position. Let $I^i$ denote the i-th image, with $i=0,1 \ldots N_I-1$, and let $I_n^{i} \equiv I^i(p_n)$ denote the image intensity at the n-th pixel position in $I^i$. We take $I^0$ as the reference image. Let $P_n$ denote the 3D point imaged at $p_n$ in the reference image, with $P_n \equiv (X_n, Y_n, Z_n)^T$ in the coordinate system of $I^0$. Let $d_n^i$ denote the shift in image position from $I^0$ to $I^i$ of the 3D feature point $P_n$. The motion of the camera is described as its translation and rotation. Let $T^i \equiv (T_x^i, T_y^i, T_z^i)^T$ represent the camera translation between the reference image and image i, and let $R^i$ denote the camera rotation. In accordance with the method of the present invention we parameterize a small rotation by the rotational velocity $\omega^i \equiv (\omega_x^i, \omega_y^i, \omega_z^i)^T$. Let a 3D point P transform as $P'=R(P-T)$. Let $p_n^{i} \equiv (x_n^i, y_n^i)T \equiv p_n + d_n^i$ be the shifted position in $I^i$ of $p_n \in I^0$ resulting from the motion $T^i, R^i$.

Given a vector V, define $[V]_2$ as the length-2 vector consisting of the first two components of V. Let $\underline{V}$ denote the 2D image point corresponding to the 3D point V: $\underline{V} \equiv [V]_2/V_z$. For a 2D vector v, define the corresponding 3D point $\bar{v} \equiv [v^T \ 1]^T$. $R*v$ denotes the image point obtained from v after a rotation: $R*v \equiv \underline{(R\bar{v})}$. Let $\hat{v} \equiv v/|v|$.

The three rotational flows of the camera are defined as $$r^{(1)}(x,y), r^{(2)}(x,y), r^{(3)}(x,y) \text{ by}$$

$$[r^{(1)}, r^{(2)}, r^{(3)}] \equiv \left[ \begin{pmatrix} -xy \\ -(1+y^2) \end{pmatrix}, \begin{pmatrix} 1+x^2 \\ xy \end{pmatrix}, \begin{pmatrix} -y \\ x \end{pmatrix} \right].$$

Let $\nabla I_n = \nabla I(p_n)$ represent the smoothed gradient of the image intensities $I^0(p_n)$ and define $(I_{xn}, I_{yn})^T \equiv \nabla I_n$. Similarly, let $\Delta I_n^i$ be the change in (smoothed) intensity with respect o the reference image. With no smoothing $\Delta I_n^i = I_n^i - I_n^0$. Let $\Delta$ be a $(N_I-1) \times N_p$ matrix with entries $\Delta I_n^i$.

Define the $(N_I-1) \times (N_I-1)$ matrix $C^{ii'} \equiv \delta^{ii'}+1$, and use $$\left[C^{-\frac{1}{2}}\right]^{ii'} = \delta^{ii'} - \left(1+N_I^{-\frac{1}{2}}\right)/(N_I-1).$$

Preliminary Analysis

Before describing the method of the present invention, we shall describe the preliminary analysis used to derive the translational and rotational flow vectors to be applied in the algorithm. For small rotations and translations, the matrix of feature-shifts $d_n^i$ is approximately bilinear in the unknown $T^i, R^i, Z_n$. (We do not assume that the rotations are small initially, but we can take them as small following their initial recovery and compensation.) By contracting this matrix with the $\nabla I_n$, we get via the brightness constancy equation (described later herein) a bilinear relation between the intensity changes $\Delta I_n^i$ and unknowns.

Derivation

The derivation of the flow vectors is described as follows. Up to noise, the feature-shift $d_n^i$ can be written as $$d_n^i = d_{Tn}^i + d_{Rn}^i, \quad (1)$$

$$d_{Tn}^i = \frac{Z_n^{-1}(T_z^i p_n - [T^i]_2)}{1 - Z_n^{-1} T_z^i}, \; d_{Rn}^i \equiv p_n^i - R^{-1} * p_n^i.$$

Where $d_{Rn}^i = d_{Rn}^{-1}(R^i, p_n^i)$ represents the rotational part of the shift and $d_{Tn}^i$ represents the translational part. When there is zero rotation, $d_{Tn}^i = d_{Tn}^i$. One can rewrite $d_{Rn}^i = R^{i*} p_{Tn} - p_{Tn}$, where $p_{Tn} \equiv R^{-1} * p_n^i = p_n + d_{Tn}^i$. We assume small translations and small residual rotations. Then $p_T \approx p_n + O(Z_\tau^{-1})$, $$d_{Tn}^i \approx Z_n^{-1}(T_z^i p_n - [T^i]_2) + O(Z^{-2}\tau^2), \quad (2)$$

$d_{Rn}^i \approx \omega_x r^{(1)}(p_n) + \omega_y r^{(2)}(p_n) + \omega_y r^{(3)}(p_n) + O(\omega^2, \omega Z^{-1}, \tau, \omega$ represent the average sizes of the $Z_i^{-1}$, the translations and the residual rotations in radians. From "A Linear Solution for Multiframe Structure from Motion", J. Oliensis, IUW 1225–1231, 1994 we get, $\omega \approx Z^{-1}\tau$.

Then using the brightness constancy equation (BCE), $$\Delta I_n^i + \nabla I_n \cdot d_n^i = 0, \quad (3)$$

which holds up to corrections of $O(Z^{-2}\tau^2, \omega^2, \eta)$ where $\eta$ gives the typical size of the noise in $I_n^i$. The brightness constancy equation and (2) imply that $-\Delta I_n^i \approx Z_n^{-1} (\nabla I_n \cdot p_n T_z^i - \nabla I_n [T^i]_2) + \nabla I_n \cdot (\omega_x^i r_n^{(1)} + \omega_y^i r_n^{(2)} + \omega_y^i r_n^{(3)})$. Then we define the three length-$N_p$ translational flow vectors as $$\Phi_x = -\{Z^{-1} I_x\}, \; \Phi_y = -\{Z^{-1} I_y\}, \; \Phi_z = -\{Z^{-1}(\nabla I_z \cdot p)\},$$

and also define the three length-$N_p$ rotational flow vectors as $$\Psi_x = \{\nabla I \cdot r^{(1)}(p)\}, \; \Psi_y = \{\nabla I \cdot r^{(2)}(p)\}, \; \Psi_z = \{\nabla I \cdot r^{(3)}(p).$$

Then let $\Phi \equiv [\Phi_x \; \Phi_y \; \Phi_z]$ and $\Psi \equiv [\Psi_x \; \Psi_y \; \Psi_z]$. Then $-\Delta \approx T\Phi^T + W\Psi^T$. Then we define H as a $(N_p-3) \times N_p$ matrix that annihilates the three vectors $\Psi_x$, $\Psi_y$, $\Psi_z$ and satisfies $HH^T = 1_{N_p-3}$, where $1_{N_p-3}$ is the identity matrix. One can then compute H, and products involving H, in $O(N_p)$ using Householder matrices, which are described in "A Linear Solution for Multiframe Structure from Motion", J. Oliensis, IUW 1225–1231, 1994, and "A Multi-frame Structure from Motion Algorithm under Perspective Projection" J. Oliensis, IJCV 34:2/3, 163–192, 1999, and Workshop on visual Scenes, 77–84, 1995. It then follows that $$-\Delta H^T \approx \overline{T}\Phi^T H^T \quad (4)$$

up to $O(Z^{-2}\tau^2, \omega^2, \omega Z^{-1}\tau, \eta)$. In practice, we use equation (4) above left-multiplied by $C^{-1/2}$, with $\Delta_{CH} \equiv C^{-1/2} \Delta H^T$. Multiplying by $C^{-1/2}$ reduces the bias due to singling out the reference image for special treatment, a process described in "A Multi-frame Structure from Motion Algorithm under Perspective Projection" which is referenced above.

Equation (4) relates the data-matrix, on the left, to the translations and structure, on the right. Multiplying by H has eliminated the rotational effects up to second order. These second order corrections include corrections of $O(\omega \eta)$, caused by errors in the measured $\nabla I$ we use to define H. For small translations, $O(Z^{-1}\tau) \sim O(\omega)$ as described in "Rigorous Bounds for Two-Frame Structure from Motion," J. Oliensis IUW, 1225–1231, 1994 so all the corrections in equation (4) have similar sizes: $O(Z^{-2}\tau^2) \sim O(\omega Z^{-1}\tau) \sim O(\omega^2)$. Therefore, multiplying by H was crucial to reduce the rotational corrections to the same order as the translational corrections.

Linear-Motion Algorithm

The basic algorithm of the present invention for cases of linear camera motion is more particularly described as follows.

0. Recover rotations and warp all images $I^1 \ldots I^{N_1-1}$ toward the reference image $I^0$, while neglecting the translations. Let the image displacements $d_n^i$ now refer to the unrotated images.

1. Compute H and $\Delta_{CH}$. Using the singular value decomposition, compute the best rank-1 factorization of $-\Delta_{CH} \approx M^{(1)} S^{(1)T}$, where $M^{(1)}$, $S^{(1)}$ are vectors. If the leading singular value of $-\Delta_{CH}$ is much larger than the rest, this confirms that the motion is approximately linear and that the signal dominates the noise so that the algorithm has enough information to proceed. $C^{1/2} M^{(1)}$ gives the translation magnitudes up to an overall multiplicative scale.

2. Divide the image into small smoothing windows and take $Z_n^{-1}$ as constant within each window. List the pixels so that those in the k-th smoothing window have sequential indices $\eta k, (\eta_k+1), \ldots (\eta_{k+1}-1)$. Then compute a $N_p \times N_p$ projection matrix $P_\Omega$ which is block diagonal with zero entries between different smoothing windows, and which annihilates the vectors $\{\nabla I \; p\}$, $\{I_x\}$, and $\{I_y\}$. Then solve the overconstrained system of equations $$P_\Omega(H^T S^{(1)} - \Psi w) = 0 \quad (5)$$

for the 3-vector w.

To complete the method of the Linear-Motion Algorithm, compute a $N_p \times N_p$ projection matrix $P_T$, which is block diagonal with zero entries between different smoothing windows and annihilates $(H^T S^{(1)}) - \Psi w$ where w is the vector recovered previously. Then solve for the direction of translation $\hat{T}$ via $$P_{\hat{T}}(-\hat{T}_x\{I_x\} - \hat{T}_y\{I_y\} + \hat{T}_z\{p \cdot \nabla I\}) = 0 \quad (6)$$

Finally, recover $Z_n$ via $$(H^T S^{(1)})_n - [\Psi w]_n = Z_n^{-1}(T_z p_n - [T]_2) \cdot \nabla I_n \quad (7)$$

Linear-Motion Algorithm Analysis

Step 2.

From (4), $S^{(1)} \sim H\{Z^{-1}(\hat{T}_z p - [\hat{T}]_2) \cdot \nabla I\}$. Then since $H_T H$ is a projection matrix annihilating the $\Psi_x, \Psi_y, \Psi_z$ it follows that $$H^T S^{(1)} \sim H\{Z^{-1}(T_z p - [T]_2) \cdot \nabla I\} + \Psi w \quad (8)$$

for some w. Since the matrix $P_\Omega$ annihilates the first term on the right hand side of (8), we get (5). $P_\Omega$ and its products can be computed in $O(N_p)$. Solving (5) for w neglects the constraints that $\hat{T}$ is the same in each smoothing window, a total of $2(N_w-1)$ constraints, where $N_w$ is the number of windows. Then applying $P_{\hat{T}}$ to (8) gives (6). Because we omitted $2(N_w-1)$ constraints, Step 2 gives a suboptimal estimate of $\hat{T}$ and $Z_n^{-1}$. As before, one can base Step 2 on a multi-frame reestimate of $I^0$ and as before the caveat that if the original noise in $I^0$ is less than the recomputed $I^0$, one should use $I^0$ directly.

The linear-motion algorithm extends to deal with a camera translating on a plane or in all 3D directions. The number $N_L$ of large singular values $\Delta_{CH}$ determines the dimensionality of the motion, e.g., planar motion corresponds to $N_L=2$. For each large singular value, the corresponding singular vector gives rise to an equation similar to (8), which can be solved as before for $\hat{T}$, where each singular vector yields a different $\hat{T}$. One recovers the $Z_n^{-1}$ from $N_L$ equations of the form of (7).

Implementation

It will be apparent to those skilled in the art that the methods of the present invention disclosed herein may be embodied and performed completely by software contained in an appropriate storage medium for controlling a computer.

Referring to FIG. 1, which illustrates in block-diagram form a computer hardware system incorporating the invention. As indicated therein, the system includes a video source 101, whose output is digitized into a pixel map by a digitizer 102. The digitized video frames are then sent in electronic form via a system bus 103 to a storage device 104 for access by the main system memory during usage. During usage the operation of the system is controlled by a central-processing unit, (CPU) 105 which controls the access to the digitized pixel map and the invention. The computer hardware system will include those standard components well-known to those skilled in the art for accessing and displaying data and graphics, such as a monitor, 106 and graphics board 107.

The user interacts with the system by way of a keyboard 108 and or a mouse 109 or other position-sensing device such as a track ball, which can be used to select items on the screen or direct functions of the system.

The execution of the key tasks associated with the present invention is directed by instructions stored in the main memory of the system, which is controlled by the CPU. The CPU can access the main memory and perform the steps necessary to carry out the method of the present invention in accordance with instructions stored that govern CPU operation. Specifically, the CPU, in accordance with the input of a user will access the stored digitized video and in accordance with the instructions embodied in the present invention will analyze the selected video images in order to extract the 3D structure information from the associated digitized pixel maps.

Figure 2:
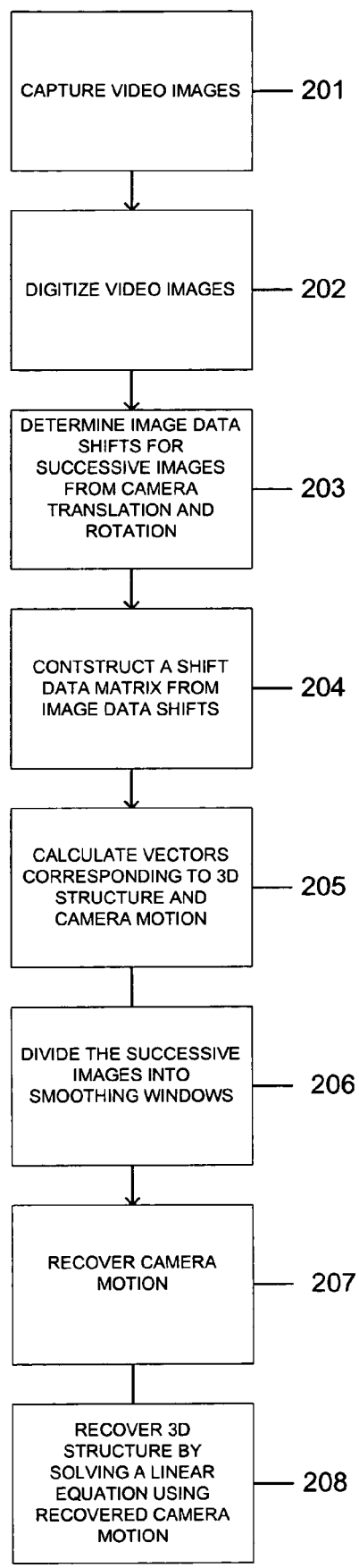
FIG. 2 is a block diagram that illustrates the method of the present invention.

Referring now to FIG. 2 the method of the present invention will be described in relation to the block diagram. A first image in a sequence is taken by a camera at a reference perspective and one or more successive images are taken by moving the camera along a substantially linear plane to one or more successive different perspectives in step 201. The images are then digitized 202 for analysis of the 3D image content, i.e. image intensities. From the digitized 3D image content, determining image data shifts for each successive image 203 with respect to the reference image; the shifts being derived from the camera translation and/or rotation from the reference perspective to the successive different perspectives.

Then incorporating the image data shifts for each image, constructing a shift data matrix 204. The shift data matrix is then used to calculate two rank-1 factorizations from the shift data matrix using SVD, one rank-1 factorization being a vector corresponding the 3D structure and the other rank-1 factorization being a vector corresponding the camera motion 205. The successive images are divided into smoothing windows 206 and the camera motion is recovered from the factorization vectors between the smoothing windows by solving a linear equation 207. Finally, the 3D structure is recovered by solving a linear equation using the recovered camera motion 208.

While there has been shown and described what is considered to be preferred embodiments of the invention, it will, of course, be understood that various modifications and changes in the form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An image processing method for recovery of a scene structure from successive image data where motion of the scene structure is linear, the method comprising the steps of:

(a) computing rotational motion in the successive image data using rotational flow vectors derived from a set of intensity data collected from the successive image data where the rotational flow vectors are represented by $$\Psi_x=[\nabla I \cdot r^{(1)}(p)], \Psi_y=[\nabla I \cdot r^{(2)}(p)], \Psi_z=[\nabla I \cdot r^{(3)}(p)],$$

where $\nabla I$ represents a gradient of the intensity data $r^{(1)}$, $r^{(2)}$, $r^{(3)}$ are three-point rotational flows with respect to a pixel position p;

(b) constructing a shift data representation for the intensity data that compensates for the rotational motion in the successive image data;

(c) decomposing the shift data representation into a motion vector and a structure vector;

(d) dividing the successive image data into smoothing windows; and (e) computing a projection matrix which is block diagonal between different smoothing windows and which is used to recover the scene structure by solving for the structure vector.

2. The image processing method of claim 1 wherein the shift data representation is decomposed using singular value decomposition.

3. The image processing method of claim 2 wherein singular value decomposition is used to compute a rank-1 factorization of $-\Delta_{CH} \approx M^{(1)} S^{(1)T}$ where $M^{(1)}$ is the motion vector and $S^{(1)}$ is the structure vector.

4. The image processing method of claim 1 wherein the method is iterated until it converges to a reconstruction of the scene structure.

5. The image processing method of claim 1 wherein the projection matrix is a $N_p$ by $N_p$ matrix which is defined to annihilate an expression $$(H^T S^{(1)}) - \Psi w$$

where $N_p$ is a number of pixels in an image, H is a matrix which annihilates the rotational flow vectors, $S^{(1)}$ is the structure vector, $\Psi$ is a matrix formed from the rotational flow vectors, and w is a vector selected so as to allow the structure vector to be solved.

6. A device-readable medium comprising instructions for performing an image processing method for recovery of a scene structure from successive image data where motion of the scene structure is linear, the method comprising the steps of:

(a) computing rotational motion in the successive image data using rotational flow vectors derived from a set of intensity data collected from the successive image data, where the rotational flow vectors are represented by $$\Psi_x=[\nabla I \cdot r^{(1)}(p)], \Psi_y=[\nabla I \cdot r^{(2)}(p)], \Psi_z=[\nabla I \cdot r^{(3)}(p)],$$

where ∇I represents a gradient of the intensity data, $r^{(1)}$, $r^{(2)}$, $r^{(3)}$ are three-point rotational flows with respect to a pixel position p;

(b) constructing a shift data representation for the intensity data that compensates for the rotational motion in the successive image data;

(c) decomposing the shift data representation into a motion vector and a structure vector;

(d) dividing the successive image data into smoothing windows; and (e) computing a projection matrix which is block diagonal between different smoothing windows and which is used to recover the scene structure by solving for the structure vector.

7. The device-readable medium of claim 6 wherein the shift data representation is decomposed using singular value decomposition.

8. The device-readable medium of claim 7 wherein singular value decomposition is used to compute a rank-1 factorization of $-\Delta_{CH} \sim M^{(1)} S^{(1)T}$ where $M^{(1)}$ is the motion vector and $S^{(1)}$ is the structure vector.

9. The device-readable medium of claim 6 wherein the method is iterated until it converges to a reconstruction of the scene structure.

10. The device-readable medium of claim 6 wherein the projection matrix is a $N_p$ by $N_p$ matrix which is defined to annihilate an expression $$(H^T S^{(1)}) - \Psi w$$

where $N_p$ is a number of pixels in an image, H is a matrix which annihilates the rotational flow vectors, $S^{(1)}$ is the structure vector, $\Psi$ is a matrix formed from the rotational flow vectors, and w is a vector selected so as to allow the structure vector to be solved.

* * * * *